United States Patent
Galetto et al.

(10) Patent No.: US 7,583,610 B2
(45) Date of Patent: Sep. 1, 2009

(54) DETERMINATION OF SPEECH LATENCY ACROSS A TELECOMMUNICATION NETWORK ELEMENT

(75) Inventors: Stefano Galetto, Lendinara (IT); Roberto Cappon, Santa Maria di Sala (IT)

(73) Assignee: Tektronix, Inc., Beaverton, OR (US)

( * ) Notice: Subject to any disclaimer, the term of this patent is extended or adjusted under 35 U.S.C. 154(b) by 586 days.

(21) Appl. No.: 11/030,775

(22) Filed: Jan. 5, 2005

(65) Prior Publication Data

US 2005/0157705 A1    Jul. 21, 2005

(30) Foreign Application Priority Data

Jan. 21, 2004    (EP)    ................... 04001231

(51) Int. Cl.
*G01R 31/08*    (2006.01)
(52) U.S. Cl. ...................................... 370/252
(58) Field of Classification Search ................. 370/352, 370/241, 252
See application file for complete search history.

(56) References Cited

U.S. PATENT DOCUMENTS

| | | | |
|---|---|---|---|
| 6,321,264 B1 * | 11/2001 | Fletcher et al. | 709/224 |
| 6,868,069 B2 * | 3/2005 | Knobbe et al. | 370/252 |
| 2001/0001616 A1 * | 5/2001 | Rakib et al. | 375/259 |
| 2001/0050592 A1 * | 12/2001 | Wright et al. | 330/2 |
| 2002/0064149 A1 * | 5/2002 | Elliott et al. | 370/352 |
| 2002/0186167 A1 * | 12/2002 | Anderson | 342/465 |
| 2004/0179515 A1 * | 9/2004 | Kamani et al. | 370/352 |

* cited by examiner

*Primary Examiner*—Kevin C Harper
*Assistant Examiner*—Sai-Ming Chan
(74) *Attorney, Agent, or Firm*—Michael J. Fogarty, III; Matthew D. Rabdau

(57) ABSTRACT

Determination of speech latency across a communication network element having an input interface and an output interface includes allocating a timestamp to the data packets of a sample of data packets representing a speech signal at the two interfaces, recording the timestamps together with the corresponding data packets, decoding the recorded data packets at both interfaces to generate respective envelopes in the time domain, cross-correlating the envelopes to determine correlating areas of the envelopes, and determining a value for the speech latency between the interfaces from the timestamps associated with correlating areas of the envelopes.

13 Claims, 2 Drawing Sheets

US 7,583,610 B2

DETERMINATION OF SPEECH LATENCY ACROSS A TELECOMMUNICATION NETWORK ELEMENT

BACKGROUND OF THE INVENTION

The present invention relates to telecommunication network analysis, and more particularly to determination of speech latency across a telecommunication network element.

In a third generation (3G) telecommunication scenario "packet based" networks, such as UMTS (Universal Mobile Telecommunication System), permit an optimized use of band resources, adopting Adaptive Multi Rate (AMR) codecs for speech compression and Discontinuous Transmission (DTX) techniques to meet customer satisfaction as a trade-off between Quality of Service (QoS) and costs. The QoS provided by such telecommunication networks depends upon a number of factors, including an overall end-to-end speech latency and distortion introduced using low bit rate codecs.

Speech latency is a time delay between a speech signal at the input of a network device and the same signal at its output, e.g., across two sides of a media gateway in the UMTS architecture. This delay depends on propagation time of the speech signal through the network device, on buffering mechanisms used by codecs (typically at least 20 ms of data packets are buffered before starting an encoding algorithm), and on processing time spent by transcoding equipment for encoding/decoding and forwarding data packets. Moreover, speech latency over UMTS interfaces is affected by typical phenomena occurring in "packet based" networks, such as jitter and packet loss.

Jitter is a packet delay variation due to non-constant arrival times of data packets. The effect of this phenomenon may be attenuated using de-jitter buffers, but such buffers introduce further end-to-end delay. Adaptive de-jitter buffers also may be used with a variable length modified as a function of the monitored jitter during speech pauses. Nevertheless, such adaptive de-jitter buffers introduce a variable speech latency that may impact the overall quality perceived by customers.

Packet loss and packet duplication influence QoS in terms of distortion and speech latency, especially in the presence of burst packet loss when consecutive packets are not received at the network end points. To reduce the effect of this impairment, ad-hoc packet loss concealment (PLC) techniques commonly are used which reduce the distortion perceived by listeners and allow correct reconstruction of the speech signal envelope in the time domain. The disadvantage of these techniques is the requirement of a precise packet loss evaluation, i.e., check of the frame number field for consecutive packets, which cannot be guaranteed in the early stages of the design of 3G network elements.

Currently the technical problem of the assessment of speech latency in a telecommunication network is solved by using an "end-to-end" approach. Manufacturers and operators set up calls between two handsets, saving digital speech signals at the two termination points, i.e., talker mouth and listener ear, and comparing them using end-to-end off-line algorithms. However, even if this approach allows the evaluation of the overall speech latency between two terminating points, it does not provide an accurate measure of the delay introduced by each current or new digital network element within the network. At the same time the use of low bit rate codecs, such as the AMR codecs, no longer allows for predicting theoretically and with high precision the part of the overall delay due to encoding algorithms. This particularly applies to codecs with no linear speech-dependent complexity.

What is desired is the determination of speech latency across a communication network element as opposed to end-to-end speech latency.

BRIEF SUMMARY OF THE INVENTION

Accordingly the present invention provides for the determination of speech latency across a communication network element by allocating a timestamp to the data packets of a sample of data packets representing a speech signal at input and output interfaces of the network element, recording the timestamps together with the corresponding data packets, decoding the recorded data packets at both interfaces to generate respective envelopes in the time domain, cross-correlating the envelopes to determine correlating areas of the envelopes, and determining a value for the speech latency from the timestamps associated with the correlating areas of the envelopes.

The objects, advantages and other novel features of the present invention are apparent from the following detailed description when read in conjunction with the appended claims and attached drawing.

DETAILED DESCRIPTION OF THE SEVERAL VIEWS OF THE DRAWING

DETAILED DESCRIPTION OF THE INVENTION

Using an UMTS network as an example, instead of analyzing a reconstructed speech signal at two terminating handsets in an end-to-end approach, the speech signals present at UMTS interfaces at the input and the output of a network element in question are analyzed, i.e., a device-to-device approach that directly processes speech packets at the UMTS interfaces to minimize unpredictable jitter or packet loss effects and to provide accurate measures across the network element under test.

Figure 1:
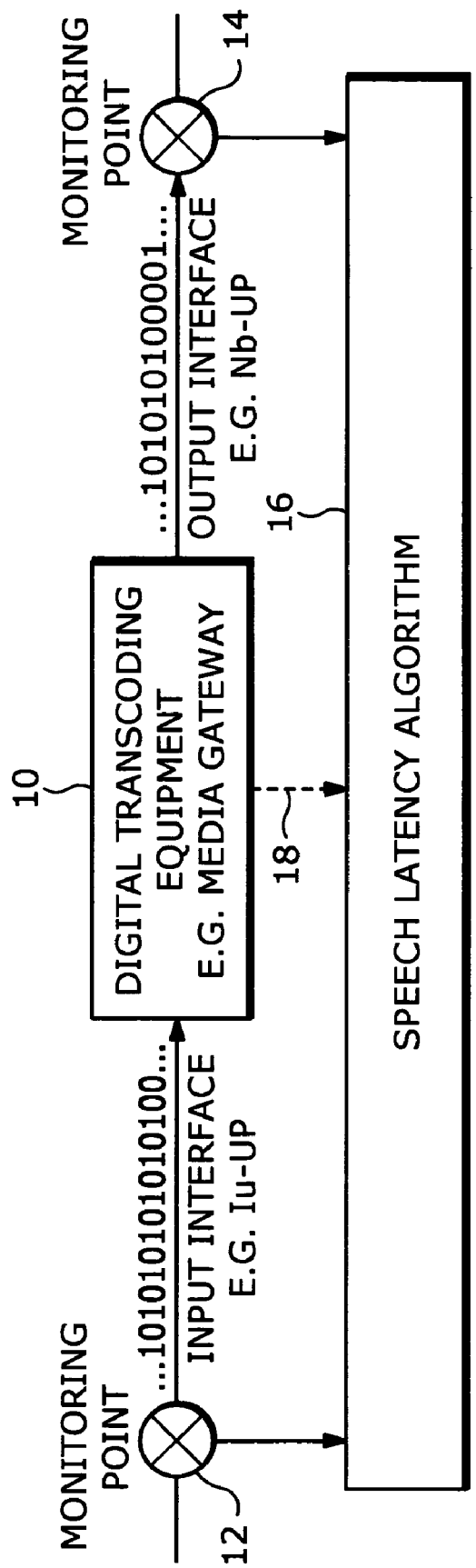
FIG. 1 is a simple block diagram view of a device in a communication network for determining speech latency across a network element according to the present invention.

Referring now to FIG. 1 a network element 10 under test, which may include one or more network elements and concerns, e.g., a media gateway, generally is arranged in a communication network (only suggested in FIG. 1) and is designed to transmit a speech signal encoded in digital data, either in a circuit switched or a packet-oriented way. "Packet-oriented" means that several users share one channel while "circuit switched" means that a channel is reserved for one user. In a transcoding element a change of transmission rate may be performed, as well as a change of format, e.g., going from a wireless system to a hardline system. At an input of the network element 10 an input interface 12, e.g., a Iu-UP interface, is provided while at the output of the network element an output interface 14, e.g., an Iub-UP interface, is provided. At these two interfaces 12, 14 data are present in digital form. These interfaces 12, 14 serve as monitoring points to input the respective signals to a device 16 for determining the speech latency across the network element 10. The arrow 18 represents an optional interface that on the control plane may provide information via call start/stop, but which is not necessary.

Figure 2:
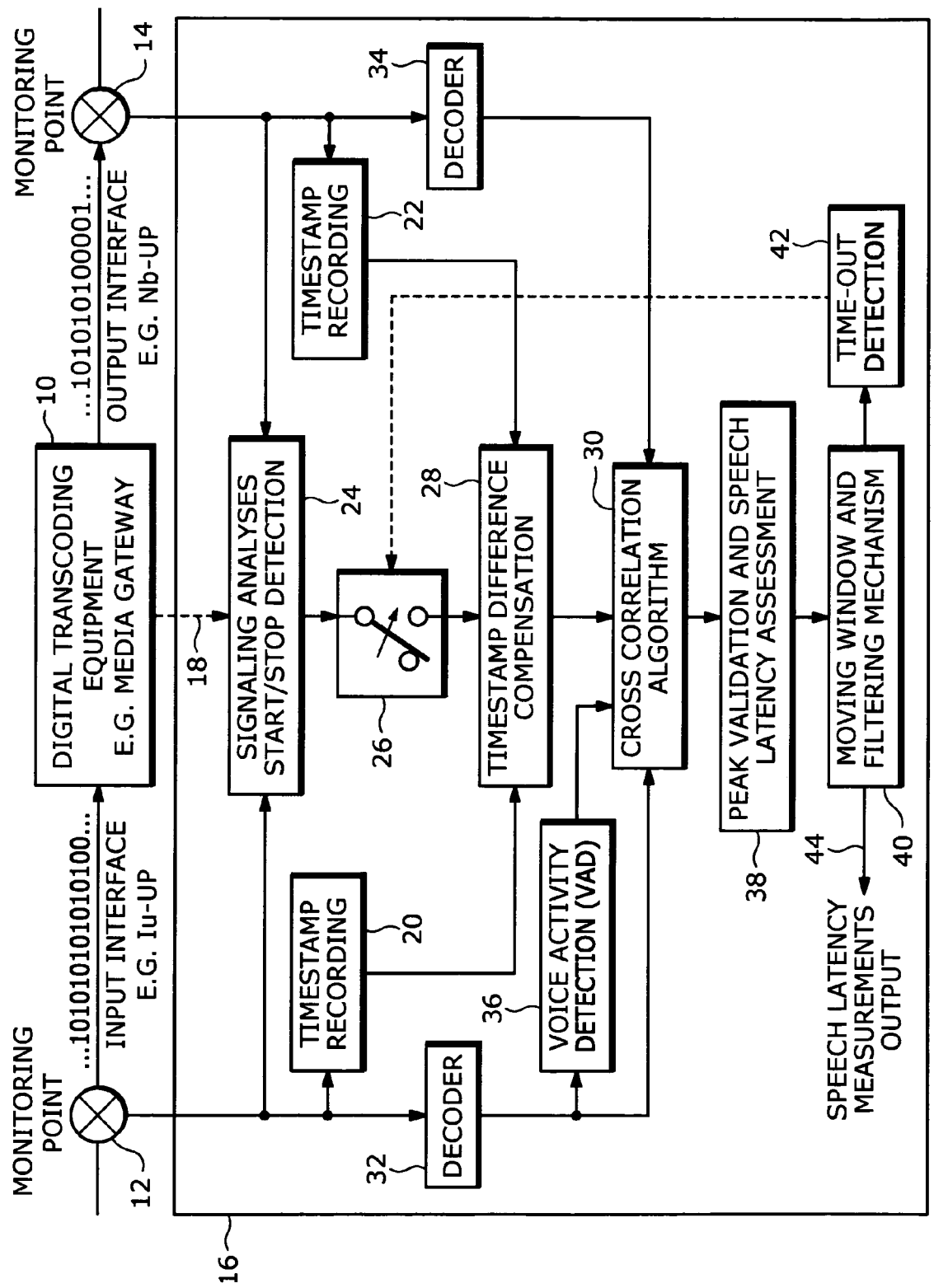
FIG. 2 is a detailed flow diagram view for the device of FIG. 1 according to the present invention.

Input and output speech data packets to and from the network element 10 are processed in the same way except for Voice Activity Detection (VAD). They are recorded with their timestamp, decoded and cross-correlated with each other to obtain a first "raw" measure. A statistical approach and mobile window filtering is then used to provide more accurate results. For more details, reference is made to FIG. 2 where the individual functional blocks of the device 16 are shown. Depending on the interface 12, 14 involved, signalling information, e.g. call start and stop, may be provided directly from the network element 10, see arrow 18, following ITU-TH.248 Megaco protocol. Usually, however, the device 16 retrieves all needed information directly from the User Plan layer of each interface 12, 14, e.g. Iu-UP and Iub-UP. Blocks 20, 22 record the timestamps on the input side of the network element 10 and on the output side of the network element.

In blocks 20, 22 each packet is recorded with its arrival time (timestamp) to a precision better than 100 μs. In fact, a lower timestamp precision may affect measurement resolution (which is intended to be 1 ms), since AMR codecs deal with speech signals sampled at 8 kHz, i.e., one sample every 125 μs. In block 24 a signal analysis and a start/stop detection takes place. It is intended to correlate the measurement start/stop to the call begin/end point. As already mentioned above, depending on the interfaces 12, 14 involved, the information is provided by the Megaco protocol or by the User Plan layer. This block 24 also drives switch block 26 that enables timestamp difference compensation, as is described in more detail with reference to block 28, only at one time when a call is in progress and the timestamp of the first speech packets at the input and output of the network element 10 are available. The purpose of the timestamp difference compensation block 28 is to synchronize the two packet flows at the input and output of the network element 10 by computing a timestamp difference to take care of the situation in which the input and output channels are not set up at the same time. The block 28 works as follows: (1) it records a first speech packet (A) in the output direction, then (2) a succeeding speech packet (B) in the input direction, and finally (3) the succeeding speech packet (C) in the output direction. The timestamp difference is computed between packets C and B, converted to a number of samples (each sample being 125 μs in the given example), and sent to a cross-correlation algorithm block 30.

Decoders 32, 34 are situated at the input and the output, respectively, for decoding the compressed speech packets and reconstructing the speech signal envelope in the time domain. Optionally, before the decoder blocks 32, 34 a de-jittering buffer and some known packet loss concealment (PLC) techniques may be inserted for simulating a sort of "end-to-end" scenario where the only element present in the network is the network element 10. However, by default only the decoder blocks 32, 34 are used in the algorithm.

Since the cross-correlation algorithm 30 requires stationary signals to produce reliable results, the input speech signal envelope from the input decoder block 32 is processed with a VAD (Voice Activity Detection) algorithm in block 36 that separates speech signals and voice pauses or noise. Only when the VAD algorithm 36 recognizes the presence of a voice signal, does the cross-correlation start in block 30. Block 30 performs the cross-correlation between the input and output speech samples using an "overlap-safe" method with a buffer size equal to 2048 in the present example. When the call starts and the timestamp difference is estimated, the cross-correlation algorithm 30 delays the output signal with the computed difference, filling the buffer with zero values. This permits computation of the actual delay between speech samples, even if packets have not been sampled synchronously or if the two channels were not set up at the same time. Each correlation may be 1 s long and starts when all eight (2048/256) input subblocks of 32 ms are classified as voice by the Voice Activity Detection block 36. Since in the preferred embodiment each packet contains 160 speech samples (each 20 ms) and correlation is performed on 2048 samples, an adaption circular buffer also is used. In block 38 a peak validation and speech latency assessment is provided. Block 38 validates the cross-correlation peak and provides a "raw" speech latency measure. For each cross-correlation (1 s long) the peak is computed and compared with the cross-correlation standard deviation following this rule: if the peak is greater than the product from threshold and standard deviation, the peak is validated and a "raw" measure is computed; otherwise the peak is rejected.

As an example the threshold is equal to 7 and is tuned using ad-hoc databases containing male and female speech samples following the ITU-T P.800 standard, all AMR codecs, VAD enabled and disabled. In block 40 moving window and filtering mechanisms are provided. Each "raw" measure is inserted in a moving window "buffer" containing preferably five "raw" measures. In the buffer the measure to be processed is saved together with the two previous and the two consecutive ones, and it is validated when there is at least one value within a predetermined range of the measure being processed in the "moving window" (default values are used for the first two and the last two measures). Such a mechanism is used to filter spurious measures and provides the assessment of the speech latency with high accuracy.

A timeout detection block 42 takes into account the fact that in some cases the technique for evaluating packet loss generated along the network, i.e., because a network element involved in the past does not work correctly, may need an on-the-fly adjustment to ensure the speech signal is correctly reconstructed. In this event the timeout detection block 42 is inserted so that, when the timeout expires due to persistent and unrecoverable network impairments, the switch 26 enables another timestamp difference computation, resynchronizes input and output signals, and resets the cross-correlation during the ongoing call. Via output 44 the block 40, when there is a positive comparison, provides the result of the speech latency measurement.

Laboratory tests in a simulated environment with tunable packet loss percentage have provided the following results:
 99% of measures are within 1 ms of the actual speech latency value in all test conditions, i.e., male and female speech samples following ITU-T P.800 standard, all AMR codecs, VAD (voice activity detection) enabled and disabled;
 accurate figures are provided in variable noisy environments subjected to packet loss uniformly (percentage up to 10%) and burst (length up to 100 ms) distributed;
 the speech envelope is properly reconstructed in the time domain even if noise compression, e.g., DTX (discontinuous transmission) and VAD, is enabled.

Thus a designer can determine how a certain network element, e.g., a more recent version of a given element, affects the overall performance of a communication network. With regard to an optimization of the relationship between QoS and speech latency, it is possible to tune a buffer, i.e., to determine an optimum middle size of storage.

Thus the present invention provides determination of speech latency across a telecommunication network element by decoding a speech signal at the input and output of the network element, correlating the resultant speech envelopes, and determining from timestamps for correlated areas of the envelopes a speech latency value.

What is claimed is:

1. A method of determining speech latency across a communication network element having a input interface and an output interface comprising the steps of:
    allocating at each interface for a sample of data packets representing a speech signal a timestamp to each data packet and recording each data packet together with its timestamp;
    decoding the data packets recorded from the interfaces and generating an envelope for each interface in the time domain;
    cross-correlating the envelopes to determine correlating areas between the envelopes;
    determining a value for the speech latency from the timestamps associated with the correlating areas.

2. The method according to claim 1 further comprising the step of, prior to the decoding and generating step, performing a signal analysis to determine whether a speech transmission is taking place at the interfaces.

3. The method according to claims 1 or 2 further comprising the step of, before the allocating and recording step, synchronizing the data packets to be recorded at the interfaces.

4. The method according to claim 3 wherein the synchronizing step comprises the steps of:
    determining a timestamp difference by recording a first speech packet in a output direction from the network element, recording a succeeding speech packet in an input direction to the network element, recording the succeeding speech packet in the output direction from the network element, and determining the timestamp difference between the succeeding speech packets input to and output from the network element; and
    transforming the timestamp difference into a number of samples for synchronizing the data packets.

5. The method according to claim 4 further comprising the steps of:
    resynchronizing the data packets to be recorded at the interfaces in case of persistent and unrecoverable network impairments; and
    restarting at the timestamp difference determining step.

6. The method according to claim 5 wherein in the cross-correlating step the data packets output from the network element are delayed by the timestamp difference.

7. The method according to claim 1 further comprising the step of, prior to the cross-correlating step, separating data packets having speech signals from data packets having noise signals and proceeding to the cross-correlating step only when the presence of the speech signal is detected.

8. The method according to claim 1 further comprising the step of, between the cross-correlating and determining steps, comparing a peak computed from the cross-correlating step with a predeterminable threshold and performing the determining step only when the peak is larger than the predeterminable threshold.

9. The method according to claim 1 further comprising the step of after the determining step comparing the value for the speech latency with predeterminable values to output the value for the speech latency only when it is within a predeterminable range of the predeterminable values.

10. The method according the claim 9 wherein the determining step provides a series of values for the speech latency and the preterminable values are neighbouring values to a current one of the values.

11. An apparatus for determining speech latency across a communication network element having an input interface and an output interface comprising:
    means for allocating a timestamp to the data packets of a sample of data packets representing a speech signal at each of the interfaces;
    means for recording the timestamps together with the corresponding data packets;
    means for decoding the recorded data packets at both interfaces to generate respective envelopes in the time domain;
    means for cross-correlating the envelopes to determine correlating areas of the envelopes; and
    means for determining a value for the speech latency from the timestamps associated with the correlating areas.

12. A method of determining speech latency across a communication network element having a input interface and an output interface comprising:
    recording timestamps from input data packets at the input interface;
    recording timestamps from output data packets at the output interface;
    decoding compressed speech data from the input data packets;
    constructing an input speech signal envelope from decoded input data packets;
    decoding compressed speech data from the output data packets;
    constructing an output speech signal envelope from decoded output data packets;
    analyzing the input speech signal envelope using a voice activity detection circuit to identify the presence of voice signals;
    cross-correlating the input speech signal envelope and the output speech signal envelope when a voice signal is detected; and
    measuring speech latency using cross-correlation peaks generated by the cross-correlation.

13. The method of claim 12, further comprising:
    synchronizing an input data packet flow and an output data packet flow using a timestamp difference compensation circuit, the timestamp difference compensation based upon the recorded input data packet timestamps and the recorded output data packet timestamps.

* * * * *